(12) United States Patent
Valko et al.

(10) Patent No.: US 10,402,624 B2
(45) Date of Patent: Sep. 3, 2019

(54) PRESENCE SENSING

(71) Applicant: Apple Inc., Cupertino, CA (US)

(72) Inventors: Edward Allen Valko, San Jose, CA (US); Matthew C. Waldon, San Francisco, CA (US); Rudolph Van der Merwe, Portland, OR (US); William Matthew Vieta, Santa Clara, CA (US); Myra M. Haggerty, San Mateo, CA (US); Alex T. Nelson, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/445,623

(22) Filed: Feb. 28, 2017

(65) Prior Publication Data

US 2017/0193282 A1 Jul. 6, 2017

Related U.S. Application Data

(63) Continuation of application No. 13/219,573, filed on Aug. 26, 2011.
(Continued)

(51) Int. Cl.
*G06K 9/00* (2006.01)
*G09G 5/00* (2006.01)
*G06T 7/20* (2017.01)

(52) U.S. Cl.
CPC .......... *G06K 9/00255* (2013.01); *G06T 7/20* (2013.01); *G09G 5/00* (2013.01);
(Continued)

(58) Field of Classification Search
CPC .................................................. G06F 1/3231
See application file for complete search history.

(56) References Cited

U.S. PATENT DOCUMENTS

| 4,437,089 A | 3/1984 | Achard |
| 5,903,350 A | 5/1999 | Bush et al. |

(Continued)

FOREIGN PATENT DOCUMENTS

| CN | 101639800 | 2/2010 |
| DE | 102008047413 | 4/2010 |

(Continued)

OTHER PUBLICATIONS

Rahmann et al., "Reconstruction of Specular Surfaces Using Polarization Imaging," Proceedings of the IEEE Computer Conference on Computer Vision and Pattern Recognition, pp. I-149-I-155, 2001.
(Continued)

*Primary Examiner* — Michael A Faragalla
*Assistant Examiner* — Chayce R Bibbee
(74) *Attorney, Agent, or Firm* — Brownstein Hyatt Farber Schreck, LLP

(57) ABSTRACT

One embodiment may take the form of a method of operating a computing device to provide presence based functionality. The method may include operating the computing device in a reduced power state and collecting a first set of data from a first sensor. Based on the first set of data, the computing device determines if an object is within a threshold distance of the computing device and, if the object is within the threshold distance, the device activates a secondary sensor to collect a second set of data. Based on the second set of data, the device determines if the object is a person. If the object is a person, the device determines a position of the person relative to the computing device and executes a change of state in the computing device based on the position of the person relative to the computing device. If the object is not a person, the computing device remains in a reduced power state.

20 Claims, 11 Drawing Sheets

Related U.S. Application Data

(60) Provisional application No. 61/485,610, filed on May 12, 2011, provisional application No. 61/504,026, filed on Jul. 1, 2011.

(52) U.S. Cl.
CPC .............. *G06T 2207/20076* (2013.01); *G09G 2330/022* (2013.01); *G09G 2354/00* (2013.01)

(56) References Cited

U.S. PATENT DOCUMENTS

| | | | |
|---|---|---|---|
| 6,072,894 A | 6/2000 | Payne | |
| 6,146,332 A | 11/2000 | Pinsonneault et al. | |
| 6,359,664 B1 | 3/2002 | Faris | |
| 6,603,502 B2 | 8/2003 | Martin et al. | |
| 6,775,397 B1 | 8/2004 | Hamalainen | |
| 6,802,016 B2 | 10/2004 | Liu | |
| 6,832,006 B2 | 12/2004 | Savakis et al. | |
| 7,006,236 B2 | 2/2006 | Tomasi et al. | |
| 7,009,378 B2 | 3/2006 | Blake et al. | |
| 7,117,380 B2 | 10/2006 | Kangas | |
| 7,136,513 B2 | 11/2006 | Waehner et al. | |
| 7,151,530 B2 | 12/2006 | Roeber et al. | |
| 7,164,781 B2 | 1/2007 | Kim et al. | |
| 7,317,868 B2 | 1/2008 | Oshima et al. | |
| 7,324,824 B2 | 1/2008 | Smith et al. | |
| 7,369,685 B2 | 5/2008 | DeLean | |
| 7,436,569 B2 | 10/2008 | Yao et al. | |
| 7,536,037 B2 | 5/2009 | Sung et al. | |
| 7,806,604 B2 | 10/2010 | Bazakos | |
| 7,840,031 B2 | 11/2010 | Albertson et al. | |
| 7,903,166 B2 | 3/2011 | Daly | |
| 7,929,729 B2 | 4/2011 | Huang et al. | |
| 8,068,636 B2 | 11/2011 | Rodriguez et al. | |
| 8,107,721 B2 | 1/2012 | Beardsley et al. | |
| 8,154,615 B2 | 4/2012 | Fedorovskaya et al. | |
| 8,254,699 B1 * | 8/2012 | Zhao | G06K 9/6232 348/699 |
| 8,264,536 B2 | 9/2012 | McEldowney | |
| 8,345,086 B2 | 1/2013 | Hirasawa | |
| 8,462,989 B2 | 6/2013 | Mevissen | |
| 8,600,120 B2 | 12/2013 | Gonion et al. | |
| 8,698,753 B2 | 4/2014 | Jung et al. | |
| 8,760,517 B2 | 6/2014 | Sarwar et al. | |
| 8,880,865 B2 | 11/2014 | Abernethy et al. | |
| 8,912,877 B2 | 12/2014 | Ling et al. | |
| 8,976,277 B2 | 3/2015 | Fossum et al. | |
| 9,357,024 B2 | 5/2016 | Salazar et al. | |
| 9,536,362 B2 | 1/2017 | Sarwar et al. | |
| 10,135,822 B2 | 11/2018 | Adams | |
| 2002/0158750 A1 | 10/2002 | Almalik | |
| 2005/0221791 A1 | 10/2005 | Angelhag | |
| 2006/0140452 A1 * | 6/2006 | Raynor | G06F 1/3203 382/115 |
| 2006/0274177 A1 | 12/2006 | Masaki et al. | |
| 2007/0172099 A1 | 7/2007 | Park et al. | |
| 2007/0253603 A1 * | 11/2007 | Kimura | G06K 9/00255 382/115 |
| 2008/0151105 A1 * | 6/2008 | Kudou | H04N 9/646 348/451 |
| 2008/0291333 A1 * | 11/2008 | Subbotin | H04N 5/23248 348/700 |
| 2009/0015666 A1 | 1/2009 | Greenway et al. | |
| 2009/0322901 A1 * | 12/2009 | Subbotin | G06T 5/009 348/229.1 |
| 2010/0008900 A1 | 1/2010 | Chan et al. | |
| 2010/0158319 A1 | 6/2010 | Jung et al. | |
| 2010/0231522 A1 | 9/2010 | Li | |
| 2010/0253782 A1 | 10/2010 | Elazary | |
| 2010/0328074 A1 | 12/2010 | Johnson et al. | |
| 2011/0262044 A1 | 10/2011 | Wang | |
| 2012/0287031 A1 | 11/2012 | Valko et al. | |
| 2012/0287035 A1 | 11/2012 | Valko et al. | |
| 2014/0196131 A1 | 7/2014 | Lee | |
| 2017/0095171 A1 | 4/2017 | Park et al. | |

FOREIGN PATENT DOCUMENTS

| | | |
|---|---|---|
| EP | 1672460 | 6/2006 |
| EP | 2216999 | 8/2010 |
| EP | 2315439 | 4/2011 |
| GB | 2453163 | 4/2009 |
| JP | 2002350555 | 12/2002 |
| JP | 2003153007 | 5/2003 |
| JP | 2004348349 | 12/2004 |
| JP | 2005521975 | 7/2005 |
| JP | 2007519317 | 7/2007 |
| JP | 2007532069 | 11/2007 |
| JP | 2011018320 | 1/2011 |
| TW | 200841276 | 10/2008 |
| WO | WO 10/021375 | 2/2010 |
| WO | WO 10/073547 | 7/2010 |
| WO | WO 10/095075 | 8/2010 |
| WO | WO 10/113075 | 10/2010 |
| WO | WO 10/127488 | 11/2010 |

OTHER PUBLICATIONS

Sano et al., "Submicron Spaced Lens Array Process Technology for a High Photosensitivity CCD Image Sensor," IEEE, pp. 283-286, Dec. 1990.

Wolff et al., "Polarization Camera Sensors," Image and Vision Computing, pp. 497-510, vol. 13, No. 6, Aug. 1995.

Pascual et al., "Capturing Hand or Wrist Vein Images for Biometric Authentication Using Low-Cost Devices," Sixth International Conference on Intelligent Information Hiding and Multimedia Signal Processing, Carlos III University of Madrid, Electronics Technology Department, 2010, 5 pages.

Raghavendra et al., "A low cost wrist vein sensor for biometric authentication," Norwegian University of Science and Technology, published in Imaging Systems and Techniques (IST), 2016, IEEE International Conference, 5 pages.

* cited by examiner

PRESENCE SENSING

CROSS-REFERENCE TO RELATED APPLICATIONS

The present application is a continuation of U.S. patent application Ser. No. 13/219,573, filed Aug. 26, 2011, and entitled "Presence Sensing," which claims the benefit under 35 U.S.C. § 119(e) of U.S. Provisional Patent Application No. 61/485,610, filed May 12, 2011, and entitled, "Presence Sensing," and U.S. Provisional Patent Application No. 61/504,026, filed Jul. 1, 2011, and entitled, "Presence Sensing," the contents of which are incorporated herein by reference in their entirety as if fully disclosed herein.

TECHNICAL FIELD

The present disclosure is generally related to devices having computing capabilities and, more particularly, to sensing the presence of a user in local proximity to the device.

BACKGROUND

Many computing devices are equipped with power saving features/modes intended to reduce power consumption when a user is not using the devices. Often, these power saving features are implemented though timers that count down a set amount of time from when the user last provides an input to the device. For example, a particular device may be configured to enter a sleep mode, or other mode that consumes less power than a fully operational mode, when a user has not provided input for five minutes.

Occasionally, however, a device may enter the power saving features/modes while a user is still using the device. For example, the power saving features may be entered because the user failed to provide input within the time period set for the timer while reading content on the device, viewing a movie, or listening to music. Additionally, recovery from the power saving feature/mode may take time, may even require the user to enter credentials, and generally may be a nuisance to the user.

SUMMARY

One embodiment may take the form of a method of operating a computing device to provide presence based functionality. The method may include operating the computing device in a reduced power state and collecting a first set of data from a first sensor. Based on the first set of data, the computing device determines if an object is within a threshold distance of the computing device and, if the object is within the threshold distance, the device activates a secondary sensor to collect a second set of data. Based on the second set of data, the device determines if the object is a person. If the object is a person, the device determines a position of the person relative to the computing device and executes a change of state in the computing device based on the position of the person relative to the computing device. If the object is not a person, the computing device remains in a reduced power state.

Another embodiment may take the form of a method for determining if a user is in proximity of a computing device. The method includes capturing an image using an image sensor and computing at least one of the following from the captured image: a skin tone detection parameter, a face detection parameter and a movement detection parameter. The method also includes utilizing at least one of the skin tone detection parameter, face detection parameter and the movement detection parameter to make a determination as to whether a user is present and, if it is determined that a user is present, changing a state of the computing device.

In still another embodiment, a computing system is provided having a main processor and an image based presence sensor coupled to the main processor. The image based presence sensor includes an image sensor, and a processor coupled to the image sensor and processor configured to process the image to determine if a user is present in the image. If the processor determines that a user is present in the image, an indication that a user has been determined to be present is sent from the processor to the main processor and the main processor changes a state of the computing system based on the indication.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Figure 1:
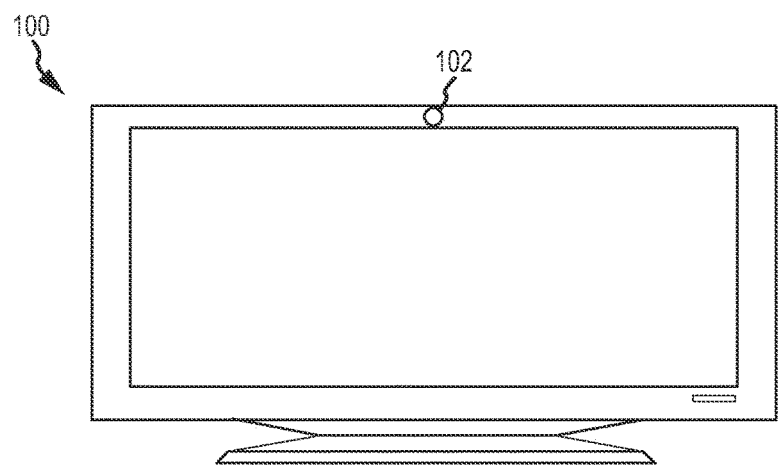
FIG. 1 illustrates an example computing device having user presence sensing capabilities.

Generally, the embodiments discussed herein are directed to user presence determination and computing device functionality related thereto. It should be appreciated that a user's experience interacting with computing devices equipped with such functionality may be improved. Further, in some embodiments, power saving and/or power efficiency may be realized through implementation of the embodiments discussed herein.

One embodiment may take the form of a computing device that is configured to sense the presence and/or absence of a user and provide an operating state based on the presence and/or absence of the user. In other embodiments, the computing device may calculate and provide a likelihood or probability score of the user being present or not present.

In some embodiments multiple parameters may be determined, weighted, and used in conjunction in making a presence determination. This weighted detection can be used for more informed higher level decision making algorithms, or when fusing data from different sensors.

For example, in some embodiments, the computing device may be configured to determine when a user arrives or enters into proximity with the computing device and/or a probability that the user is present based on sensor input. In response to a positive determination that the user is present or upon achieving a threshold probability that the user is present, the device may power up, exit a sleep mode, and/or provide some feedback to the user.

Moreover, in some embodiments, a system awake may be initiated when it is determined that a user is approaching. The system awake may include a reduced set of routines so that the system is in an operational mode faster than with a conventional power up sequence. For example, the system may power up within a half second rather than six to eight seconds due to the reduced set of routines. In some embodiments, the computing device may be configured to determine when a user moves away from the device or leaves the proximity of the device. In response, the device may enter a power saving mode, such as a display sleep mode, a system sleep mode, activation of a screen saver, and so forth. Further, the system may exit the sleep mode partially in order to speed up the computer wake up time based on sensing the presence of a user.

In some embodiments, the device may also be configured to track the user movements (e.g., vector and speed) and, in response to certain movements, provide feedback and/or enter or change a state of operation. For example, movement toward the device may activate more features, such as providing more options/menus in a user interface, whereas movement away from the device may reduce the number of features available to a user, such as reducing the number of menus/options and/or reducing or increasing the size of the options displayed. Additionally or alternatively, the display may zoom in or zoom out based on movement towards or away from the device. In some embodiments, a lateral movement of by the user (e.g., from left to right) may cause a change in a background and/or a screen saver image displayed on the device. Still further, the changing of the image may correspond generally with the sensed motion. For example, the movement from left to right may cause the image to be replaced in a left to right motion with another image.

Moreover, in some embodiments, the presence of the user may be used together with the position of the user relative to the device to provide certain functionality. In some embodiments, input and/or output may be based on the position. For example, the device may be configured to provide audio stereo panning (e.g., audio steering) directed to the user's position. Additionally, in some embodiments, microphone steering may be implemented based on the user's position.

Further, a plurality of sensors and/or operational states may be implemented in a tiered manner. That is, in a first operational mode a first sensor may be operational. Detection of movement or user presence may result in the activation of a second sensor, and so forth. In some embodiments, the activation of the second sensor may be concurrent with the device entering a second operational mode, while in other embodiments, a second operation mode may not be entered into until a determination is made based upon data retrieved from the second sensor alone or in combination with the data from the first sensor.

The presence determination may be made by data collected by one or more sensors. In one embodiment, data from one or more sensor is used to determine if a user is present. For example, a neural net, support vector machine or other suitable classifier or probabilistic determiner may be implemented. In some instances a large set of data points may be collected, classified and stored for using in the presence determination. Furthermore, subsequently acquired data may be added and used for future determinations.

Turning to the drawings and referring initially to FIG. 1, a computing device 100 is illustrated. The computing device 100 may generally include one or more sensors 102 that may be utilized for presence sensing. For example, one or more cameras and/or light sensors may be used in the presence sensing. Although cameras and light sensors will be generally discussed herein with respect to the presence sensing, it should be appreciated that other sensor types may be implemented as well, such as ultrasonic sensors, microwave RADAR, and so forth. Moreover, various techniques and wavelengths of light may be implemented. For example, proximity may be determined by focusing and defocusing, using active IR reflected power, active IR structured light; active IR time of flight (2D+depth), active IR time of flight (single pixel sensor), Passive IR (Motion detector), passive IR thermal imaging (2D), and so forth. As such, the particular embodiments described herein are merely presented as examples and are not limiting.

Figure 2:
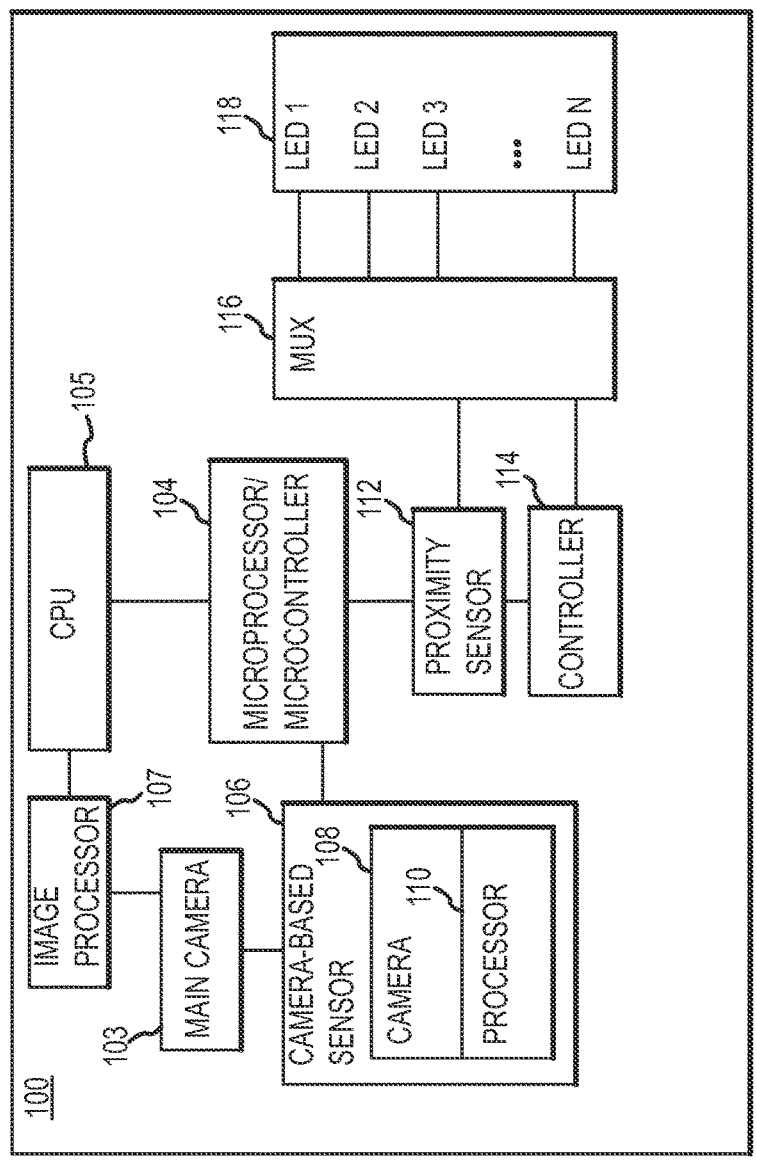
FIG. 2 is a block diagram of the computing device of FIG. 1.

FIG. 2 is a block diagram of the computing device 100 of FIG. 1. Generally, the computing device includes a microprocessor/microcontroller 104 to which other components (e.g., sensors). The microprocessor/microcontroller 104 may be implemented as one or more low power microcontrollers and as a point of data fusion for the data coming from sensors (e.g., camera, proximity, and so forth) as well as for the high-level user present or not-present decision making. In some embodiments, the user presence determination and data related thereto may be externalized and isolated from the main operation of the device. That is, the user presence system provides security and privacy by isolating the presence sensing data from the main computer processing unit (CPU) 105, the operating system, and so forth.

A variety of suitable sensors may provide input/data to the microprocessor/microcontroller 104. Specifically, a camera based sensor 106 may be communicatively coupled with the microprocessor 104. Any suitable camera based sensor may be implemented and a variety of different techniques may be utilized. For example, camera sensors available from ST Microelectronics may be used. The camera based sensor may include a full image camera 108 that provides face detection capabilities with an integrated processor 110. That is, the sensor may have an embedded microprocessor 110 and may be capable of estimating face position and distance. Additionally, the sensor may be used for determining distances of objects. The camera 108 also provides a windowed histogram information from the AGC system, which may be useful for motion detection.

Further, the camera 108 may have a horizontal field of view up to or greater than 120 degrees and a vertical field of view up to or greater than 120 degrees. In some embodiments lenses such as fish eye lenses may be used to achieve field of views having angle greater than 120 degrees. In one embodiment the horizontal field of view may be between 75-95 degrees (e.g., approximately 85 degrees) and the vertical field of view may be between 40-80 degrees (e.g., approximately 60 degrees). Faces may be detected at distances up to 20 feet or more. In one embodiment, faces may be detected at approximately 6-14 feet. Face position data may be available at between approximately 0.6-1 Hz and AGC data may be available at the full frame rate, approximately 10-30 Hz.

Generally, the images captured by the camera based sensor 106 and related raw information may not be available outside of the camera based sensor. Rather, information as to whether a face is detected within the functional range of the sensor, the position of the face and/or movement of the face within that range may be provided. In some embodiments, the camera sensor may provide a binary output indicating that a user is or is not present. Additionally, if a user is present, the position of the user relative to the device may be output by the camera based sensor, for example in x-y coordinates. Moreover, the sensor may be configured to indicate the number of faces that are present (e.g., indicate the number of people present), among other things.

In some embodiments, the camera based sensor 106 may be implemented independent of other sensors to achieve desired operational characteristics for a device. In some embodiments, the camera based sensor may be configured to operate and provide output in a tiered manner. For example, in a first state the camera based sensor may sense for user presence. If a user is present, then it may enter a second state and determine how many people are present. Subsequently, or concurrently, it may determine the location of the people who are present. As the camera moves from a state of operation, it provides an output which may be used by the device to change the state of the device, as will be discussed in greater detail below.

Some embodiments may include using a main camera 103 to capture images. The main camera 103 may be a system camera used for video and still image capture by the user of the device and, in some embodiments it may be a separate camera from the camera of the camera based sensor (e.g., there are multiple cameras in the system), while in other embodiments the main camera output may be used by the camera based sensor in lieu of the camera based sensor 106 having a dedicated camera. In one embodiment, the main camera output may be provided to an image processor 107 for use by a user as well as to a micro-controller of the camera based sensor 106 for user presence detection. There may be different options on how the image processor and user-detect co-processor communicate and make the data from the main camera available to a user. For example, when a user is not present the output from the main camera may primarily be processed by the micro-controller for the presence sensing determination. In this state, the data from the camera may generally not be made available to other components of the system. When a user is present, the output from the main camera may be provided to the image processor 107. However for the image data/information to be available, the user may be required to access a camera based application (e.g., video chat application, image capture program, or the like). Otherwise, the image data from the camera may not generally be accessible.

It should be appreciated that there may be many different configurations that allow for the desired presence sensing using one or more cameras as well as the conventional camera and image processing functionality. For example, in one embodiment, the main camera output may be routed to a single chip that combines the normal image processing functions and user presence detection functions. In other embodiments, the video output from the camera may be streamed to a host for processing by a central processing unit.

A second sensor, such as a proximity sensor 112, may also be connected to the microprocessor 104. In some embodiments, a controller 114, a multiplexer 116 and an array of light emitting diodes 118 may be operated in conjunction with the proximity sensor 112. In particular, the controller 114 may be configured to control the operation of the multiplexer 116 and the LEDs 118 in a time division multiplexed (TDM) manner. A suitable filter may be implemented to obtain a desirable response with the TDM alternating of the LEDs. In other embodiments, a mechanical device (e.g., micro electrical-mechanical device) may be used to multiplex one or more LEDs to cover discrete fields of view.

The LEDs 118 may operate in any suitable range of wavelengths and, in one example, may operate in the near infrared region of the electromagnetic spectrum. Each of the LEDs (LED1-LEDN) may be directed to a particular field of view. In some embodiments, each LED 118 may be directed to a discrete field of view, while in other embodiments the field of view of adjacent LEDs may overlap. In some embodiments, the array of LEDs 118 may distribute the LEDs about a bezel of the computing device. In other embodiments, the LED array 118 may be configured in a row (e.g., across a curved portion of a display screen bezel) with the LEDs directionally positioned to cover different field of view.

In one embodiment, an average value of the field of views (e.g., value indicating proximity) may be obtained and used to determine whether an object is in proximity with the device 100. If the average value exceeds a threshold value, it may indicate that an object is within proximity of the device 100. With the use of the array of LEDs 118, the proximity sensor may be able to more accurately detect proximity over a broad field of view. As each LED is directed to discrete field of view, the position of an object may also be determined using the proximity sensor 112. As such, in other embodiments, a change in the proximity value from a presumed empty scene may be determined. A largest change (or some rank) may be looked at across the various sensors and this value may be compared with a threshold to determine proximity and/or location.

In some embodiments, the camera based sensor 106 and the proximity sensor 112 may be utilized in conjunction with the microprocessor 104 to make a determination as to whether a user is in proximity of the computing device 100. A tiered sensing system may be implemented to provide power savings, to improve a user experience or provide a particular desired user experience, among other purposes and/or functions. In particular, the tiered sensing system may include operating a first sensor to initially determine the presence of a user within a threshold distance of the computing device to provide power savings. In some embodiments, the threshold distance may be within 2-10 feet (e.g., five feet) of the device 100. Additionally, in some embodiments, data collected from the first sensor may be used to determine a relative position of the user.

In the tiered system, if a user is present, a second sensor may be activated. Data from the second sensor, alone or in combination with data from the first sensor, may be used to further identify the user/person and/or the position of the user. The data from both the first and second sensors may be used together to make determinations as to what functions to perform and or what the user is doing. For example, it may be determined how close the user is to the device; if the user is facing the device, if the user is moving away/toward the device; and so forth. Further the data may be used to identify the user (e.g., as a credentialed user).

A state of the computing device 100 may change based on the determination that a user is present. For example, if the user is approaching the device, the display may awake, the system may awake, and so forth. If the user is moving left to right, a displayed image may change and may generally move corresponding to the movement of the user. Further, if multiple users are present (as determined based on discerning the presence of multiple faces), the device 100 may be powered to a secure state and may require entry of user credentials to fully access the device.

The presence determination may be based on multiple factors that are utilized in a neural network, support vector machine (SVM) or other machine learning based classifier or probabilistic decision system. For example, skin tone/color, presence and movement can be utilized in a weighted manner with a neural net to make a presence determination. As discussed above, based on the presence determination, the device 100 may enter/change operational states.

It should be appreciated that the selection of a particular sensor for use will be dependant upon a wide variety of factors, including functionality desired and power consumption limitations, for example. As such, in some embodiments, the camera based sensor 106 may be implemented as a first tier sensor, while in other embodiments; a proximity sensor 112 may be used as a first tier sensor. A more detailed description for implementing a proximity sensor such as the proximity sensor 112 is provided below.

The sensor 112 may chop light at some suitable frequency and measure the phase shift of the returned reflected light signal. The LED 118 outputs may be square waves or other waveforms, and the sensor 112 uses and I/O demodulation scheme. The light arriving from the sensor 112 is mixed with a sine wave and a cosine wave, giving and I (in-phase) component and a Q (quadrature) component. The sine/cosine waves are synchronized with the LED modulation. These are the 'raw' outputs from the sensors, if there is a different internal method for measurement, it may be converted to this scheme. Without loss of generality it may be assumed a period of $2\pi$, and that the integration takes place over that period. In practice, a fixed period may be used and will be integrating over some large multiple of the period. These differences result in a fixed scale factor, which may be ignored. The basic measured components are:

$s(t)$ Input signal to sensor $i(t)=\sin(t)\cdot s(t)$ $q(t)=\cos(t)\cdot s(t)$ $I=\int_0^{2\pi} i(t)dt$ $Q=\int_0^{2\pi} q(t)dt$ If measuring an object at constant (radial) distance from the sensor 112 that takes up the entire field of view, a square wave input signal of the same frequency with phase offset $\varphi$ and magnitude A, results in I and Q components:

$I=M\cdot\int_\phi^{\pi+\phi}\sin(t)dt$ $I=M\cdot(-\cos(\pi+\phi)+\cos(\phi))$ $I=2\cdot M\cdot\cos(\phi)$.

And:

$Q=M\cdot\int_\phi^{\pi+\phi}\cos(t)dt$ $Q=M\cdot(\sin(\pi+\phi)-\sin(\phi))$ $Q=-2\cdot M\cdot\sin(\phi)$ The value $\varphi$ may then be found as:

$$\phi = \arctan\left(\frac{-Q}{I}\right).$$

Then M may be reconstructed as:

$2\cdot M=\sqrt{I^2+Q^2}$

Supposing there are two objects (A and B) in the sensor's field of view, each of which is at a constant distance, the phase shifts associated with these distances may be denoted as $\varphi$ and $\psi$. The magnitude of the reflected signals may be defined to be A and B. The incoming light signals are additive in this case and so is integration, so I is:

$I=A\cdot\int_\phi^{\pi+\phi}\sin(t)dt+B\cdot\int_\psi^{\pi+\psi}\sin(t)dt$ $I=2\cdot(A\cdot\cos(\phi)+B\cdot\cos(\psi))$.

Similarly for Q:

$Q=A\cdot\int_\phi^{\pi+\phi}\cos(t)dt+B\cdot\int_\psi^{\pi+\psi}\cos(t)dt$ $Q=-2\cdot(A\cdot\sin(\phi)+B\cdot\sin(\psi))$.

Light sources whose intensity does not vary with time will give zero contribution to the I and Q components. This property provides good ambient light rejection. It also provides cancellation due to phase offset from objects at different distances. Using a one/zero square wave demodulation, this information may be retained but with worse ambient light rejection. This demodulation scheme would lead to slightly different math, but the end results would be similar. For the following, the factor of two in front of I/Q will be dropped as it gets absorbed in the other scale factors.

A few simplifications may be made and a basic model is proposed for the sensor output as a function of objects in the scene. The discrete case will be developed since it is more amenable to implementation, although other cases may be implemented as well. The LED/Sensor field of view may be partitioned into N sections indexed from 1 to N. Each of these sections has a solid angle of $\Omega_i$. Further, each of these solid angles has a fixed reflectance $\rho_i$, and is at a fixed radial distance $r_i$. Also, the output from the LED is constant across a given solid angle with emitted intensity per steradian $I_i$. The phase shift for a given distance is defined $\varphi(ri)$.

From this model, the ($I_i$, $Q_i$) contribution from a given solid angle at the sensor may be obtained. It is useful to also define a polar coordinate system in I/Q space. The magnitude of the IQ vector is defined to be $M_i$, and the angle, $\varphi_i$, is already defined.

$$M_i = \frac{I_i\cdot\cdot\Omega_i\cdot\rho_i}{r_i^2}$$

$I_i = \cdot M_i\cdot\cos(\phi(r_i))$ $Q_i = -\cdot M_i\cdot\sin(\phi(r_i))$

Both ($I_m$, $Q_m$) may be defined as the measured (raw) I and Q values. One more term ($I_c$, $Q_c$) may be added to represent any constant crosstalk (electrical or optical). Finally:

$$I_m = I_c + \sum_{i=1\ldots N} I_i$$

-continued $$Q_m = Q_c + \sum_{i=1 \ldots N} Q_i$$

Generally, to determine if a user is proximately located to a device it may be beneficial to understand the environment in which the device is located. This may help reduce false positives and more accurately determine when a user enters or exits the proximity of the device 100. However, creating a background model poses a number of challenges due to the relative lack of information provided by the sensor 112. In order to define a useful model some simplifying assumptions may be made. Initially, the mathematics of the model for a single sensor will be addressed followed by the multiple sensors case.

Fundamentally, there are two types of objects that affect the distance measurement provided by certain proximity sensors, such as sensor 112. There are those objects which can not be occluded by the person, and there those are objects which can be occluded by the person. The former will be referred to as 'foreground' objects and the latter as 'background' objects. Of course, an object could fall into both categories depending on how it is positioned relative to the person. For now, the scene may be divided into these two types of objects. Generally, the challenge is measuring the distance to the dynamic objects in the scene, such as people entering and leaving. In order to measure these objects successfully, an accurate model for the static objects in the scene is created and their relation to the dynamic object modeled.

Initially, $(I_p, Q_p)$ are defined to be the signal associated with the object that is being measured. The $(I_m, Q_m)$ and $(I_c, Q_c)$ may continue to be used as the measured (raw) and the crosstalk values, respectively.

Empty Scene

One model assumes there are no foreground or background objects, and that all of the signal is due to the person in the scene. In its purest form, the factory calibration/crosstalk values may be used:

$$I_p = I_m - I_c$$

$$Q_p = Q_m - Q_c$$

This model is may be used to produce a distance output. For scenes that have no foreground objects, this model will always over-estimate the distance. Note that this model depends on factory calibration values to be accurate over the lifetime of the device. It may not account for crosstalk added due to smudge/etc.

Once a static offset is observed, it is modeled as some combination of foreground and background objects. The choice of how to distribute this static offset strongly affects the estimate of $I_p$ and $Q_p$.

Foreground Only

One way to account for the static offset is to assume it is all due to foreground objects. Effects such as crosstalk changes due to temperature or smudge fall into this category. Foreground objects, by definition, have a constant contribution to the signal regardless of the presence of a person. In the pure foreground model, the spatial distribution of the foreground objects is not relevant—anything that is not foreground is assumed to be our object of interest. Define $(I_{fg}, Q_{fg})$ to be the signal from the foreground. This model implies:

$$I_p = I_m - I_{fg} - I_c$$

$$Q_p = Q_m - Q_{fg} - Q_c$$

Note that $(I_{fg}+I_c, Q_{fg}+Q_c)$ is the measured sensor reading with no objects of interest in the scene. This is the standard 'baseline subtraction' model.

Uniform Background with Partial Occlusion

For this model, it is assumed that the background is at a uniform distance and has uniform reflectivity. It is further assumed that objects vertically cover the field of view. The LED falloff with angle is defined as $I(\theta)$. A single object of fixed width w is assumed to correspond to an angular section $\Delta\theta_p$ at a fixed position. The center position of the object is defined in angular terms as $\theta_p$.

The general model is discussed above. For this model, area is purely a function of width, incident light is defined by $I(\theta)$, and distance/reflectance are constant but unknown.

For convenience, define:

$$L_{total} = \int_{-\infty}^{\infty} I(\theta),$$

$$L(\theta_p, \Delta\theta_p) = \frac{\int_{\theta_p - \frac{\Delta\theta_p}{2}}^{\theta_p + \frac{\Delta\theta_p}{2}} I(\theta),}{L_{total}}, \text{ and}$$

$$R(\theta_p, \Delta\theta_p) = 1 - L(\theta_p, \Delta\theta_p).$$

$L(\theta_p;\Delta\theta_p)$ represents the fraction of light from the LED that is directed at the solid angle defined by the object of interest, $L_{total}$ represents the total light output, and $R(\theta_p;\Delta\theta_p)$ represents the fraction of total light cast on the background.

The magnitude of light reaching the sensor from our object of interest is proportional to $L(\theta_p;\Delta\theta_p)$. We'll define the constant of proportionality to be $\theta_p$ and the phase offset associated with the distance to our object of interest to be $\varphi_p$. This gives:

$$I_p = p_p \cdot L(\theta_p, \Delta\theta_p) \cos(\phi_p),$$

$$Q_p = -p_p \cdot L(\theta_p, \Delta\theta_p) \sin(\phi_p).$$

Similarly, the magnitude of light from the background reaching our sensor is proportional to $R(\theta_p;\Delta\theta_p)$. The constant of proportionality is defined to be $\rho_{bg}$, and the phase associated with the background distance to be $\varphi_{bg}$. This gives us:

$$I_{bg} = \rho_{bg} \cdot R(\theta_p, \Delta\theta_p) \cdot \cos(\phi_{bg}),$$

$$Q_{bg} = -\rho_{bg} \cdot R(\theta_p, \Delta\theta_p) \cdot \sin(\phi_{bg}).$$

Upon summing:

$$I_m = I_p + I_{bg} + I_c,$$

$$Q_m = Q_p + Q_{bg} + Q_c.$$

Assuming measurement of:

$$I_{open} = \rho_{bg} \cdot \cos(\phi_{bg}) + I_c, \text{ and}$$

$$Q_{open} = -\rho_{bg} \cdot \sin(\phi_{bg}) + Q_c.$$

If the angle $\theta_p$ and width w, are known or may be assumed, this system of equations may be solved.

Uniform Background and Uniform Foreground with Partial Occlusion

For this model, start with the 'Uniform Background with Partial Occlusion' model, and build upon it, adding a foreground component that is uniform and has no spatially varying effect on the object of interest. Since the foreground components are not spatially varying, and are not affected by the presence of the object of interest, define $\rho_{fg}$ and $\varphi_{fg}$ to be the magnitude and phase of the foreground object. Now, for the foreground:

$$I_{fg} = \rho_{fg} \cdot \cos(\phi_{fg}), \text{ and}$$

$$Q_{fg} = -\rho_{fg} \cdot \sin(\phi_{fg}).$$

This can simply add into the previous model to get:

$$I_m = I_p + I_{bg} + I_{fg} + I_c, \text{ and}$$

$$Q_m = Q_p + Q_{bg} + I_{fg} + Q_c.$$

Assuming that in the empty scene it can be measured:

$$I_{open} = I_{bg} + I_{fg} + I_c, \text{ and}$$

$$Q_{open} = Q_{bg} I_{fg} + Q_c.$$

Two more variables may be added that are estimated as compared to the previous case.

Sectioned Background, Uniform Foreground

This model partitions the horizontal field of view into a series of sections 1 . . . S, each of which is modeled as a uniform foreground/uniform background. A superscript s is added to denote the section to which a variable belongs. Starting with the background sections, assume that an object is in the scene with width w corresponding to an angular section $\Delta\theta_p$, and angular position $\theta_p$. Redefine the R function sectionally to represent the fraction of light cast on the background after occlusion by the object of interest. It may be referred to as $R^s$.

Now define:

$$I_{bg}^s = \rho_{bg}^s \cdot R^s(\theta_p, \Delta\theta_p) \cdot \cos(\phi_{bg}^s), \text{ and}$$

$$Q_{bg}^s = -\rho_{bg}^s \cdot R^s(\theta_p, \Delta\theta_p) \cdot \sin(\phi_{bg}^s).$$

Since the foreground signal is not changed by an object in the scene, there is no need to model it sectionally. However, the foreground may occlude the object of interest to varying degrees across sections. This could be modeled in a number of different ways, the cleanest of which would be to associate an 'occlusion factor' $F^s$ for each foreground section. Also, $L^s$ is defined as the fraction of total light output from the LED that illuminates the objects of interest in section s. Now:

$$I_p = \rho_p \cdot \cos(\phi_p) \sum_{s=1\ldots S} L^s(\theta_p, \Delta\theta_p) \cdot F^s, \text{ and}$$

$$Q_p = -\rho_p \cdot \sin(\phi_p) \sum_{s=1\ldots S} L^s(\theta_p, \Delta\theta_p) \cdot F^s.$$

In the uniform foreground case, Fs is equal to one for all sections and the equations collapse back down to the non-sectioned foreground case. In sum:

$$I_m = I_p + I_{fg} + I_c + \sum_{s=1\ldots S} I_{bg}^s, \text{ and}$$

$$Q_m = Q_p + I_{fg} + Q_c + \sum_{s=1\ldots S} Q_{bg}^s.$$

Here, two variables are added per section for background, and one variable per section for the foreground occlusion. The occlusion effect from foreground objects may be ignored, and then only the extra background variables are added in.

Two Sensors with Overlapping Fields of View

Two sensors with an overlapping field of view may be used. Consider only the overlapping portion of the field of view and looking at what sorts of information can be glean in this region, assume that each sensor has its own $L(\theta_p; \Delta\theta_p)$, where $\theta_p$ is referenced to a global coordinate system. These may be referred to as $L^1$ and $L^2$, and use superscripts to denote the sensor. Further assume that the two sensors may differ in their sensitivity and LED output, and that this results in a scale factor error, $\alpha$, for measurements of the same object in the overlapping field of view. Also assume a $1/d^2$ relationship for distance and signal magnitude from the object of interest. Further assume that the object has a fixed reflectivity $\rho_p$ and fixed width w.

Note that $\rho_p$, $\varphi_p$, $\theta_p$ and d are common values between the two sensor measurements, and are specific to the object of interest. There is a well defined relationship between d and $\varphi_p$—see the example section herein. Here, $\alpha$ is a constant sensitivity difference between the two sensors/LEDs, which should be slowly changing over the lifetime of the sensors. With these definitions:

$$I_p^1 = L^1(\theta_p, \Delta\theta_p) \cdot \rho_p \cdot \frac{1}{d^2} \cdot \cos(\phi_p),$$

$$Q_p^1 = -L^1(\theta_p, \Delta\theta_p) \cdot \rho_p \cdot \frac{1}{d^2} \cdot \sin(\phi_p),$$

$$I_p^2 = \alpha \cdot L^2(\theta_p, \Delta\theta_p) \cdot \rho_p \cdot \frac{1}{d^2} \cdot \cos(\phi_p), \text{ and}$$

$$I_p^2 = -\alpha \cdot L^2(\theta_p, \Delta\theta_p) \cdot \rho_p \cdot \frac{1}{d^2} \cdot \sin(\phi_p).$$

These equations may be substituted for Ip and Qp into the background only partial occlusion model and generate equations for $(I_m^1, Q_m^1)$ and $(I_m^2, Q_m^2)$. There are five unknowns:

$\alpha$
$\rho_p$
$\varphi_p$
$\theta_p$
$\Delta\theta_p$

Additionally, there are four equations, so as long as one of these values is known (or may be assumed), the remaineder could potentially be calculated. It is reasonable to assume that a good initial guess at $\alpha$, and $\Delta\theta_p$ may be made. Once another sensor, such as the camera based sensor 106 is provided, for example, direct measurements for $\theta_p$ and $\varphi_p$ may be obtained. Unfortunately these equations are non-linear, so some work may still be done to show that a unique solution exists within these constraints. To accomplish this estimation process, any of a number of estimation schemes may be utilized. Examples may include using an extended Kalman filter, sigma-point Kalman filter, or direct estimation.

Example Implementation of Background Only Partial Occlusion Model

The falloff cast by the 10 degree LED sensor 112 was imaged against a white wall. Its horizontally projected falloff is approximately gaussian with a standard deviation of roughly 12 degrees. The prototype was placed about 3.5 ft above the floor in a relatively dark, empty room with a backdrop at 12 ft.

Figure 3:
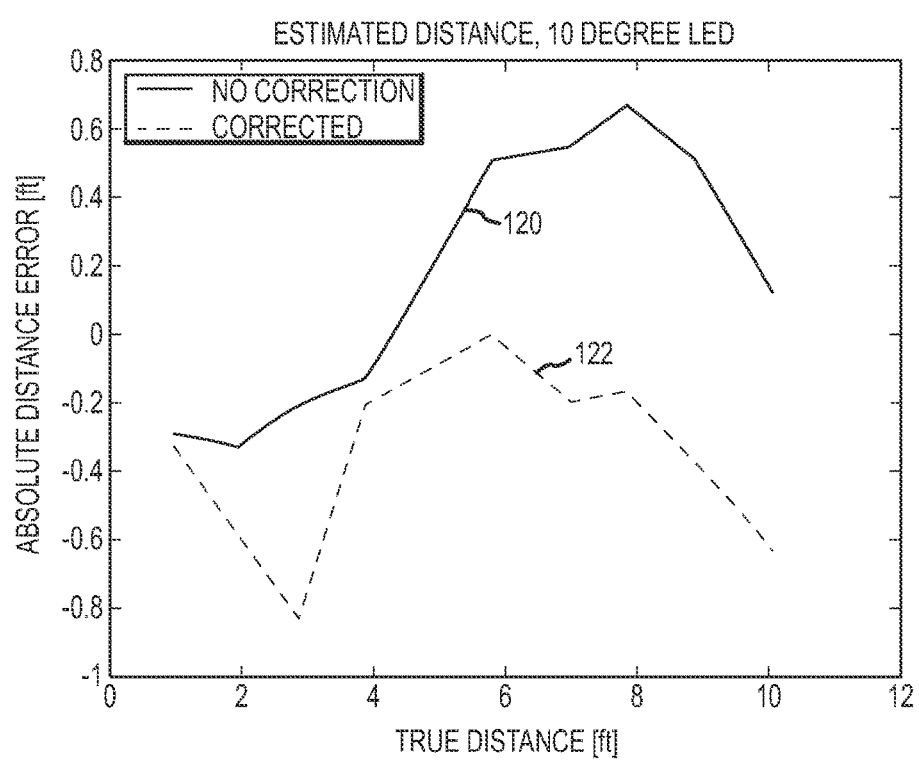
FIG. 3 is a plot showing presence sensing results when an object of interest is located at different distances from presence sensor.
Figure 4:
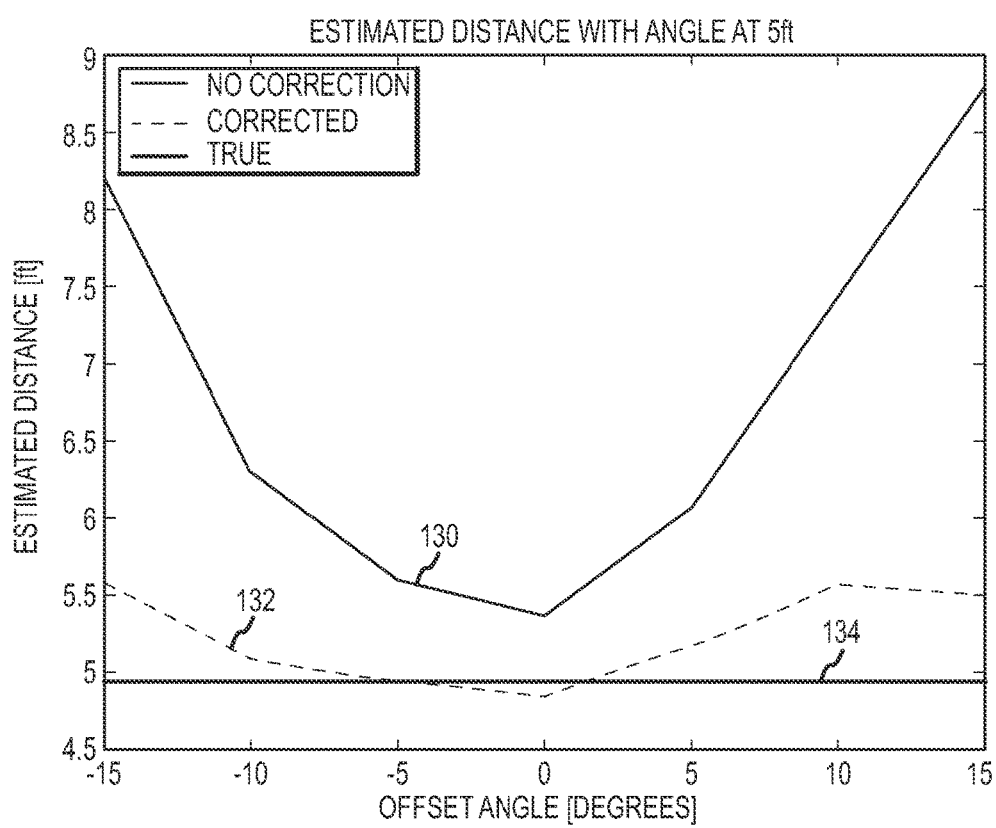
FIG. 4 is another plot showing presence sensing results when the object of interest is offset an angle from the sensor.

The crosstalk was measured with a black felt baffle covering the sensor 112. The zero phase offset was measured with a reflective baffle. The nominal 'open' background was captured. Sensor data was collected with a person standing at 1 ft increments out from the sensor 112 at a 0 degree offset from the LED out to 10 ft. Sensor data was collected in 5 degree increments at a radial distance of 5 ft, from −15 degrees to +15 degrees. The felt measurements may be referred to as $(I_c;Q_c)$, as it essentially measures crosstalk. The reflective baffle measurements may be referred to as $(I_0;Q_0)$ and the open measurements as $(I_{open};Q_{open})$. Finally, the raw measurements with the object of interest in the scene may be referred to as $(I_m;Q_m)$ and the to-be-estimated object of interest signal as $(I_p;Q_p)$. $L(\theta_p;\Delta\theta_p)$ was modeled assuming the Gaussian distribution mentioned above, whose specific form becomes:

$$L(\theta_p, \Delta\theta_p) = 0.5 \cdot \left( \text{erf}\left( \frac{1}{12} \cdot \left( \theta_p + \frac{\Delta\theta_p}{2} \right) \right) - \text{erf}\left( \frac{1}{12} \cdot \left( \theta_p - \frac{\Delta\theta_p}{2} \right) \right) \right);$$

where "erf" is the error function. Also define:

$$\phi_0 = \arctan\left( \frac{-Q_0}{I_0} \right)$$

$$\phi_p = \arctan\left( \frac{-Q_p}{I_p} \right)$$

$$d_p = \gamma \cdot (\phi_0 - \phi_p), \text{ and}$$

$$\Delta\theta_p = 2 \cdot \arctan\left( \frac{1}{d_p} \right);$$

where $\gamma$ is the conversion from phase delta to distance, and $\Delta\theta_p$ is calculated assuming person with a width of 2 ft. Now the system of equations may be set up:

$$I_m = I_p + (1.0 - L(\theta_p, \Delta\theta_p)) \cdot (I_{open} - I_c) + I_c, \text{ and}$$

$$Q_m = Q_p + (1.0 - L(\theta_p, \Delta\theta_p)) \cdot (Q_{open} - Q_c) + Q_c;$$

where $L(\theta_p;\Delta\theta_p)$ is expressed using the above equations for $\Delta\theta_p$ and $L(\theta_p;\Delta\theta_p)$. Treat $\theta_p$ as a known value, and solve the system of non-linear equations numerically. Results with real data are shown in the plots of FIGS. 3 and 4. In FIG. 3, line 120 represents no correction and line 122 represents corrected data. In FIG. 4, line 130 represents no correction, line 132 represents corrected data, and line 134 represents true distance.

With the mathematics for a single sensor 112 with various background models, multiple sensors may be combined into an integrated position model. As mentioned above, multiple proximity sensors may be implemented in one embodiment. In other embodiments, multiple LEDs may be used in a TDM manner to provide a desired field of view. Integrating a camera based sensor should allow estimation all parameters of interest.

Figure 5:
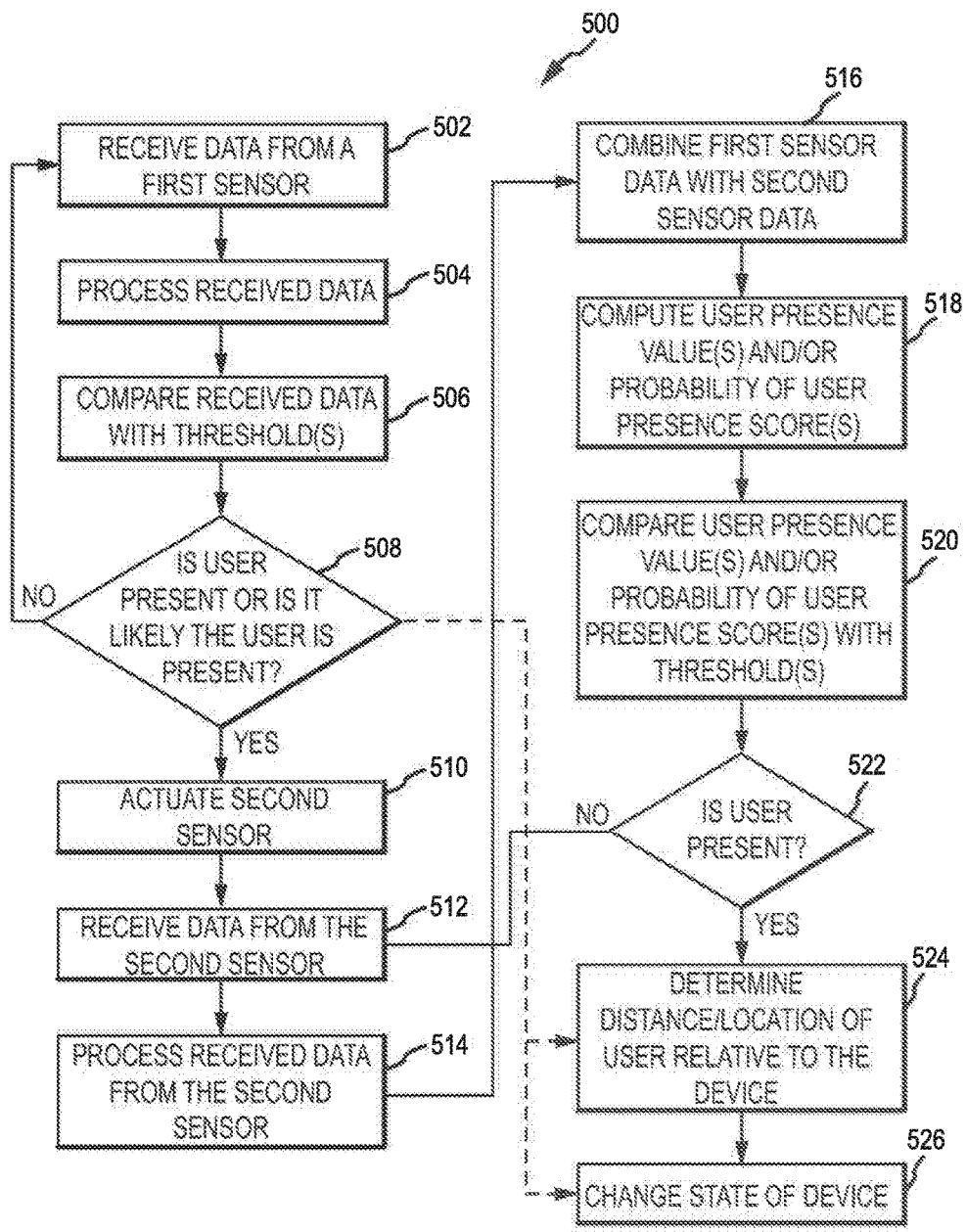
FIG. 5 is a flowchart illustrating an example method for operating a tiered presence sensor system.

FIG. 5 illustrates a method 500 for utilizing multiple sensors in a tiered manner to change the state of the device. Initially, the device may be in a reduce power consumption mode such as a sleep mode, and a controller may receive data from a first sensor (Block 502). The received data is processed (Block 504) and compared with a threshold (Block 508). The comparison with the threshold allows for a determination as to whether the user is present or is likely present (Block 508). If the user is not present, data may continue to be received from the first sensor (Block 502). If however, the user is determined to be present or is likely to be present, a second sensor may be actuated (Block 510) and data is received from the second sensor (Block 512). The data from the second sensor is processed (Block 514) and combined with the data from the first sensor data (Block 516). The processing of data from the first and second sensor may include, but is not limited to, performing digital signal processing on the data such as filtering the data, scaling the data, and/or generally conditioning the data so that it is useful for presence determination. Additionally, the combination of data from the first and second sensors may include storing the data together and/or logically or mathematically combining the data.

The data from the first and second sensors is used to compute user presence values and/or probability of user presence scores (Block 518). The user presence values and/or probability of user presence scores are compared with thresholds to determine if a user is present (Block 522). Further, if the user is determined to be present, other parameters may be determined such as distance and location of the user relative to the device (Block 524) and the state of the device may be changed (Block 526). The state change may include bringing the device into an awake mode from a sleep mode or other suitable state change.

Additionally, it should be appreciated that the determination of other parameters (e.g., distance, location, and so forth) as well as the change in state of the device may occur after a positive determination of user presence based solely on the first sensor data as indicated by the dashed line from Block 508.

Further, the second determination of user presence (Block 520) may be more accurate than the first determination (Block 508) based on the additional information provided from the second sensor. Moreover, as mentioned above, additional parameters may be determined based on the combination of data from both the first and second sensors It should be appreciated that the other embodiments may implement more or fewer steps than the method 500. FIGS. 6-11 illustrate more detailed flowcharts of methods for presence determinations.

Figure 6:
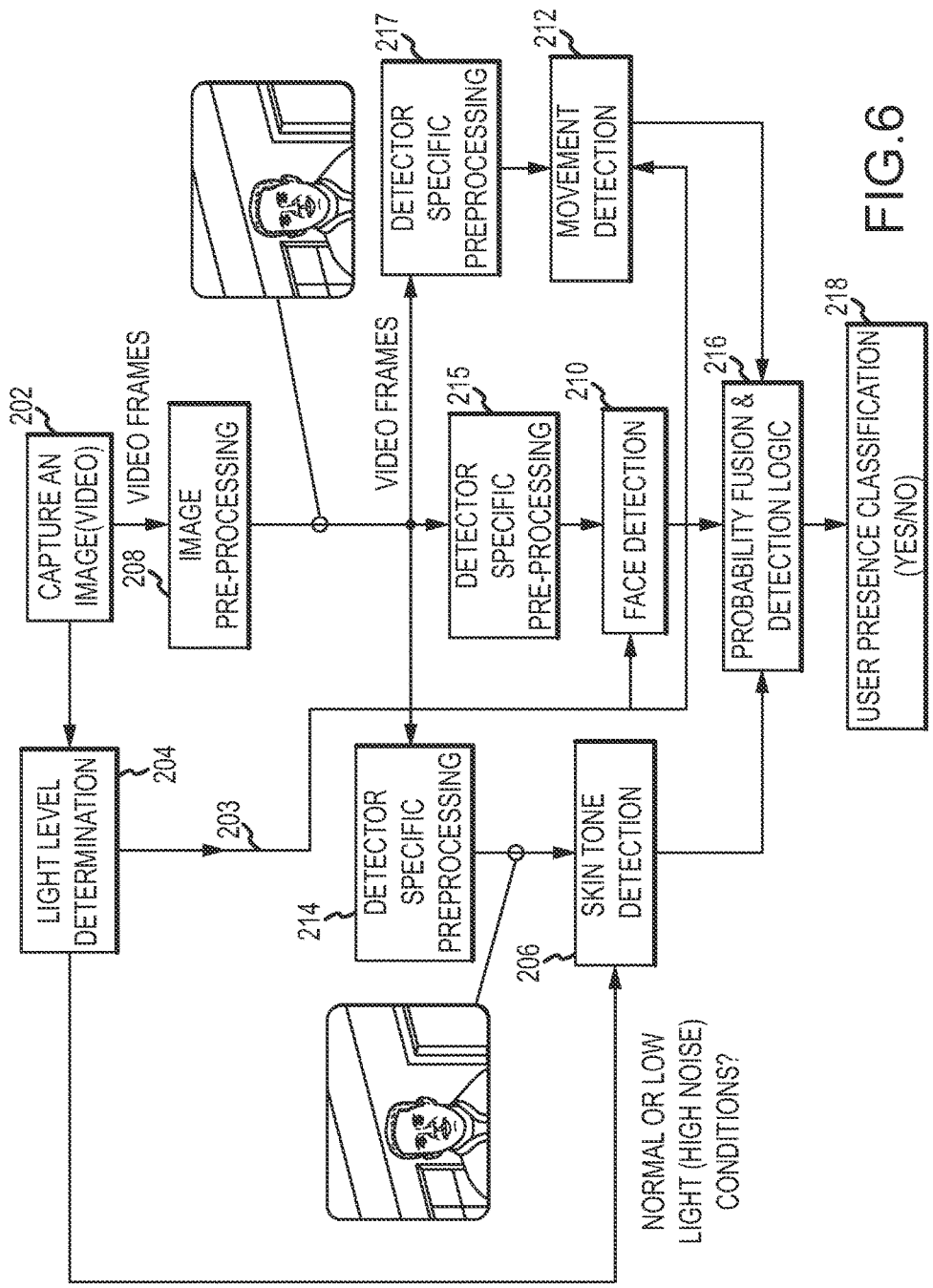
FIG. 6 is a flowchart illustrating a method for determining presence of a user.

Turning to FIG. 6, a flowchart 200 illustrating presence sensing is illustrated. Initially, a camera is used to obtain an image (Block 202). A light level determination may be made (Block 204) and provided to a skin tone detection routine (Block 206). Optionally, in some embodiments, the light level determination may be provided to other routines as well, as indicated by arrow 203. Additionally, the captured image may be pre-processed (Block 208). In some cases, the preprocessing may include down scaling of the image, changing the color space of the image and/or enhancing the image, for example. Other detector specific preprocessing may also be performed (Blocks 214, 215 and 217). For example, the image may optionally be blurred by preprocessing in Block 214 before being provided to the skin tone detection routine (Block 206). Additionally, preprocessing in Block 215 may include changing color into grayscale before providing the image to the face detection routine (Block 210) and/or performing edge detection in the preprocessing of Block 217 before providing the image to the movement detection routine (Block 212). The skin tone detection routine, face detection routine and movement detection routine are discussed in greater detail below with reference to FIGS. 7-11.

Figure 7:
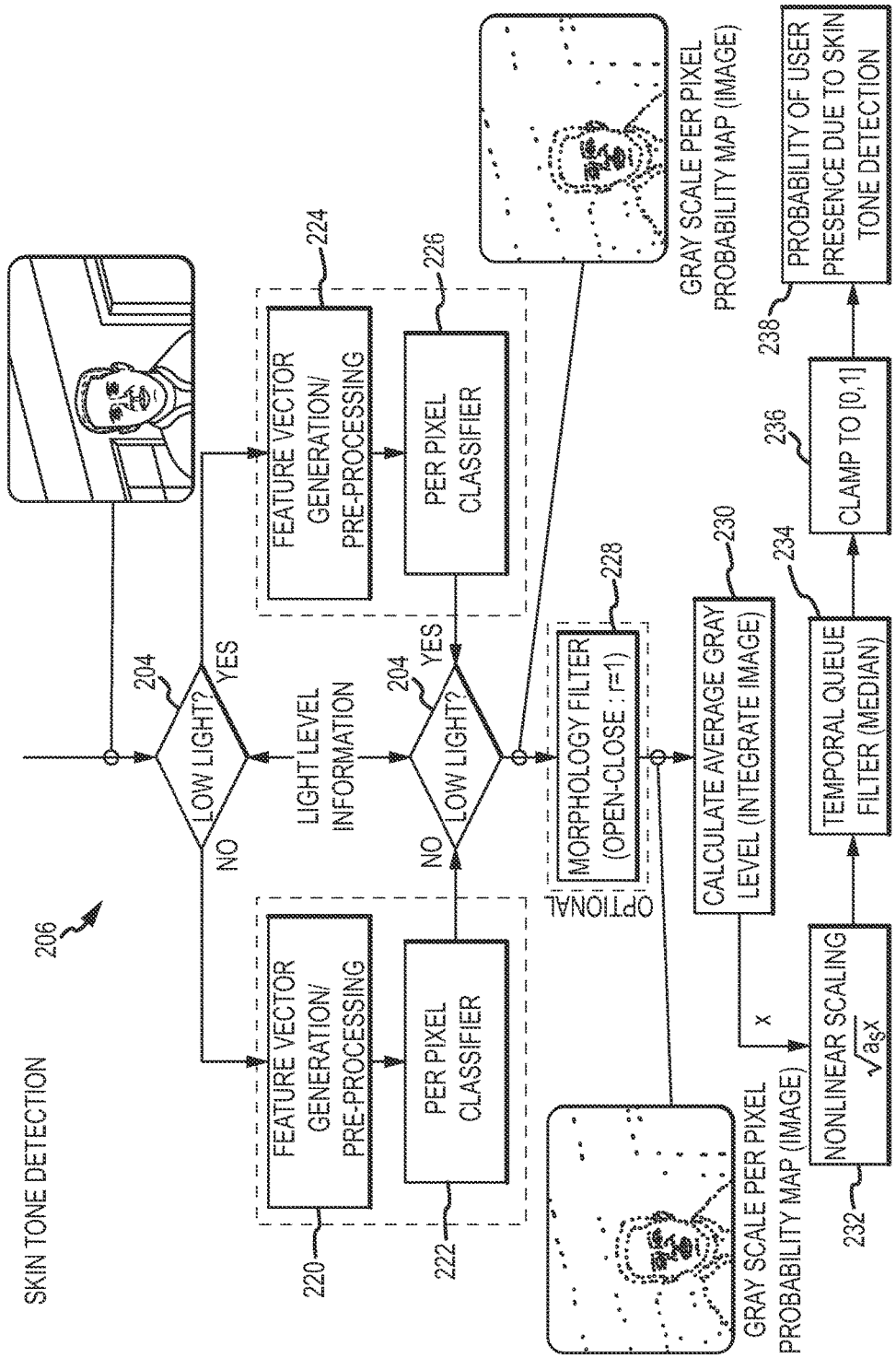
FIG. 7 is a flowchart illustrating skin tone detection routine for use in presence sensing.

The results of the skin tone detection routine, face detection routine and movement detection routine may be weighted and combined using fusion and detection logic (Block 216) and a user presence classification is determined (Block 218). The fusion and detection logic may include the use of neural networks, support vector machines, and/or some other form of probabilistic machine learning based algorithm to arrive at a determination of whether a user is present. FIG. 7 illustrates the skin tone detection routine (Block 206) as a flowchart starting with the low light determination (Block 204). It should be appreciated that the low light determination may be utilized in a variety of different manners to influence the processing of the image. For example, in some embodiments, the low light determination may be provided as a vector to a neural network, while in other embodiments the low light determination may be used to select a particular type of categorizer to be used. That is, if it is determined that the image was not taken in low light, feature vectors may be generated (Block 220), and a first pixel classifier is applied (Block 222). If the image was captured in low light, a different set of feature vectors may be generated (Block 224) and a second per pixel classifier may be applied (Block 226). The type of features, e.g., color conversion, and so forth may be selectively provided to achieve desired results and may be different depending on the low light determination. Additionally, the first and second per pixel classifiers may be different based on the low light determination. For example, the first classifier may be a 7-5-2 multilayer perceptron (MLP) feed forward neural network, per pixel classifier, while the second classifier may be a 2-12-2 MLP feed forward neural network per pixel classifier. In some embodiments, the classifiers may be implemented in an open kernel with a GPU to help speed up the process.

The output from the classifiers may be a probability (e.g., a value between 0 and 1) that indicates a probability that the image includes a skin tone. A morphology filter may optionally be applied to the image (Block 228) and an average grey scale level may be calculated (Block 230). Further, nonlinear scaling (Block 232), a temporal queue filter (Block 234) and a clamp (Block 236) may be applied before determining a probability of user presence due to skin tone detection (Block 238).

Figure 8:
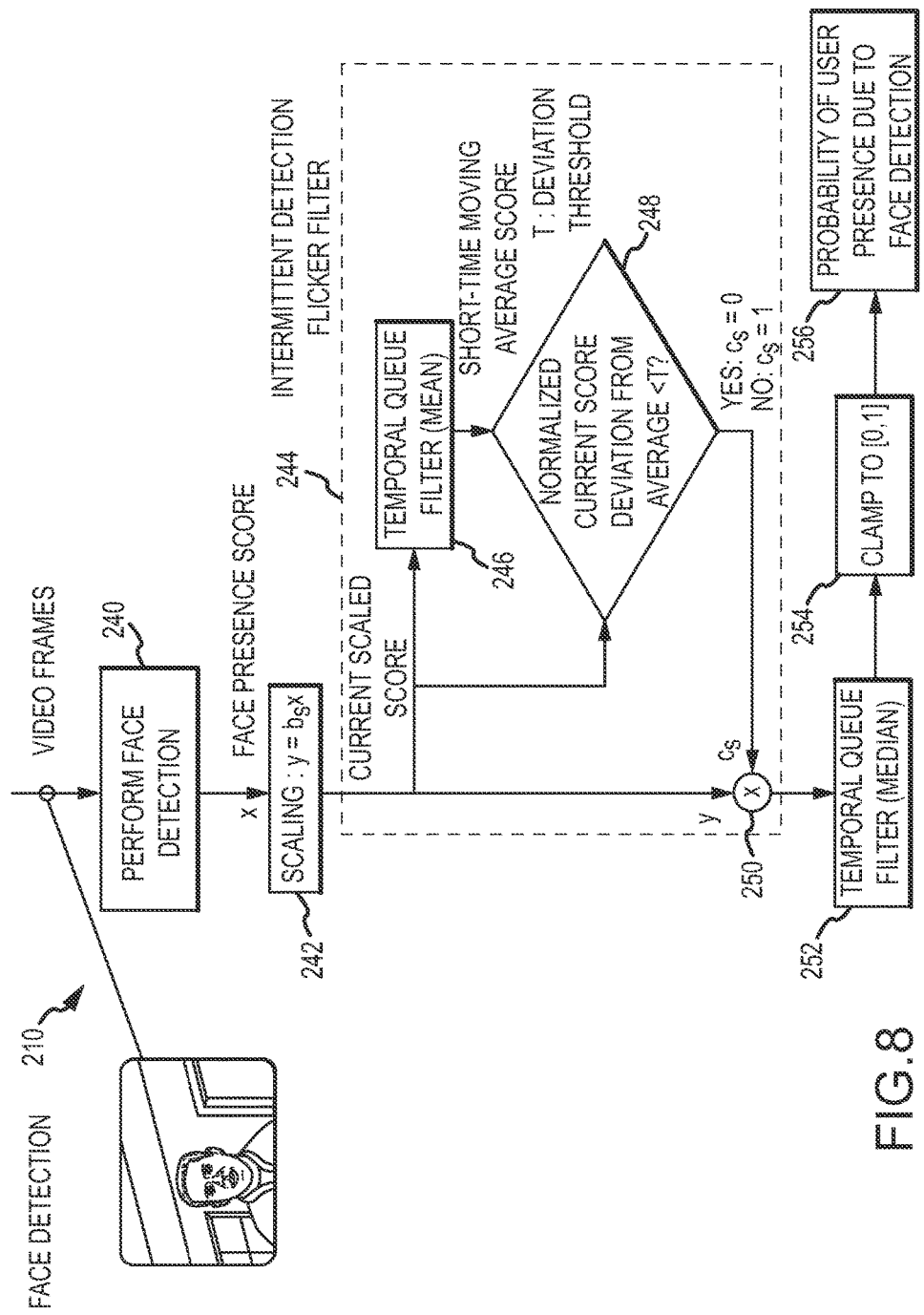
FIG. 8 is a flowchart illustrating a face recognition routine for use in presence sensing.

FIG. 8 illustrates the face detection routine (Block 210) as a flowchart starting with applying a face detector (Block 240). Any suitable face detector may be implemented, such as a Viola-Jones cascade face detector, for example, that provides a probabilistic score indicating the likelihood that a face is present. The face presence score is then scaled (Block 242) and an intermittent detection flicker filter optionally may be applied (Block 244) to smooth the image. It should be appreciated that in some embodiments, such as where the camera is of a relatively good quality, smoothing may be omitted from the process. The flicker filter may include a temporal queue filter (Block 246), determination as to whether the normalized score deviation from average is less than a threshold (Block 248) and then multiplying an output value with the scaled score (Block 250). A temporal queue filter (Block 252) and a clamp (Block 254) are applied before determining a probability of user presence due to face detection (Block 256).

Figure 9:
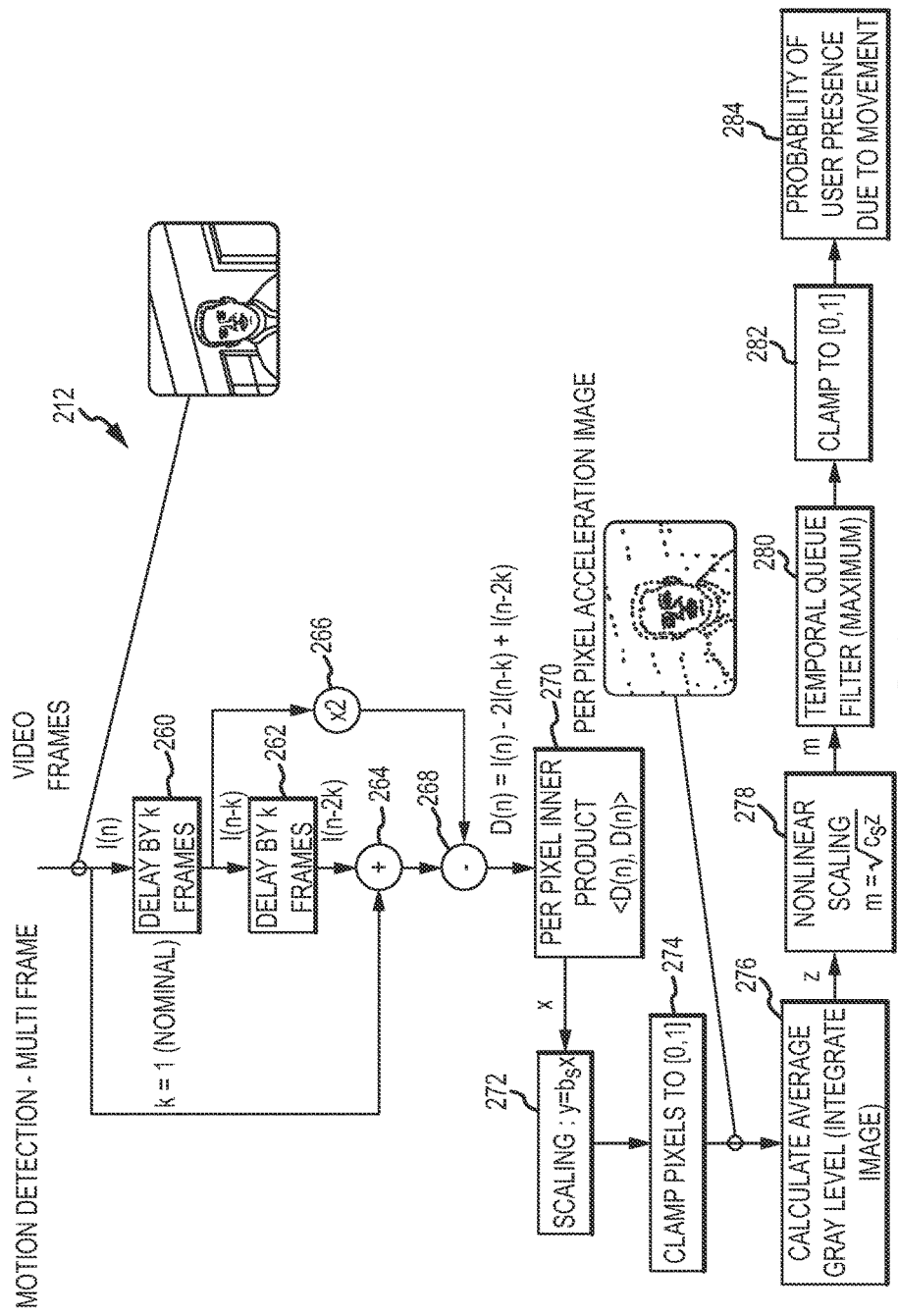
FIG. 9 is a flowchart illustrating a motion detection routine for use in presence sensing.

FIG. 9 illustrates the motion detection routine 212 as a flowchart starting by collecting multiple frames and, as such, memory may be implemented to store the multiple frames. For example, three frames may be utilized, a current frame and two other frames. In the embodiment illustrated in FIG. 9, a current frame and two subsequent frames are used. Initially, an input frames are delayed by k frames, sequentially, (Blocks 260, 262) and fed forward to be added (Block 264) with the output of the second delay (Block 262). The output of Block 260 is multiplied by 2 (Block 266) and a difference (Block 268) between the adder (Block 264) and the output of the multiplier (Block 266) is determined. A per pixel inner product is then determined (Block 270), scaled (block 272), and pixels are clamped (Block 274). An average gray level is calculated (Block 276), nonlinear scaling is performed (Block 278), temporal queue filter is applied (Block 280) and the clamped to [0,1] (Block 282). Finally, a probability of user presence due to movement is determined (Block 284).

Some parameters that may be useful in the motion detection routine may include an auto focus (AF) window statistics or horizontal edges or Sobel/Sharr edges, 2D color histogram data, component histogram data, automatic white balance/auto exposure (AWB/AE) window statistics of color content, and so forth. Some preprocessing steps may be implemented for the motion detection such as Y channel (intensity), gradient magnitude computed with either Sobel or Scharr filters (accumulating the gradient for proper normalization), threshold gradient magnitude (normalization by count of edge pixels), skin-probability in chrominance (Cr, Cb) space, sub-images of any of the foregoing, and so forth. In some embodiments, the motion detection may include the ability to computer image centroids. The distance from the centroid for the current frame to the centroid of the previous frame is used as a measure of the amount of motion, and a hard threshold is applied to produce a binary detection or motion. Hence, for example, a change in centroid location of either a Y'-intensity, edge gradient magnitude, binary edge, or skin probability image may indicate motion. Sensitivity and robustness tradeoffs may dictate a particular combination of parameters being used. For example, skin probability image may be used with edge-gradient and binary edges may be utilized to provide robustness to lighting changes. The skin probability may be performed with a neural network, as mentioned above or alternatively using an auto white balance color space filters to approximate this functionality.

Some embodiments for sensing motion may refer to window statistics of either skin detection of gradient images. One embodiment may look at a change in a global sum. In particular the image is summed over the entire frame to produce a scalar value s[i], where i is current frame index. A queue of the past N values is maintained: $S=\{s[i-1], s[i-2], \ldots s[i-N]\}$. $S_{L,N}$ is denoted as the sequence from $s[i-L]$ to $s[i-N]$, and the extremum of these values is computed as $u=\max(S_{L,N})$ and $v=\min(S_{L,N})$. The amount of motion is determined by the excursion outside of this range: $e=\max(s[i]-u, v-s[i])$. Motion is detected if e exceeds a predetermined threshold.

In some embodiments, the motion detection routine may be implemented with a single frame and thus little or no memory may be used, as full frames will not be stored. In some embodiments, the image (a single frame) may be divided into windows for which statistics may be calculated. Changes in the statistics for the windows may be used to determine motion and also position of a user.

Figure 10:
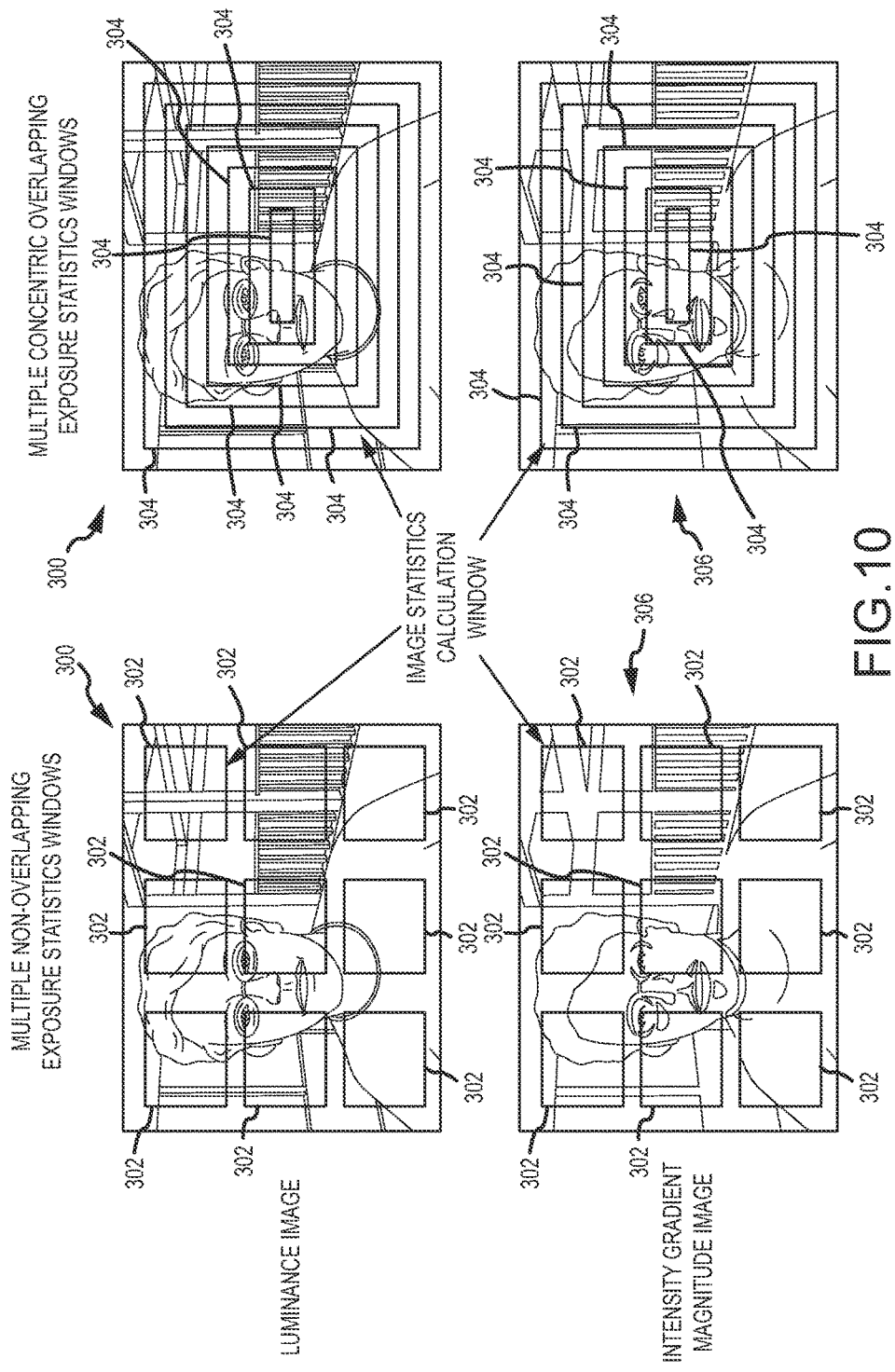
FIG. 10 illustrates frames being divided into window for single frame motion detection.

FIG. 10 illustrates possible sets of windows into which the images may be divided for single frame motion detection. Specifically, FIG. 10 shows single frames divided into both non-overlapping windows and concentric windows for statistical purposes. In each case, the luminace of the images (frames at the top of page) and intensity gradient magnitude of the images (frames at the bottom of the page) are considered. For example, an image 300 may be divided into multiple non-overlapping exposure statistics windows 302. Alternatively, the image 300 may be divided into multiple concentric overlapping exposure statistics windows 304. The statistics for each window may be determined based on a luminance image (as in image 300) or based on an intensity gradient magnitude image 306.

The use of the windows provided more robust capture of motion when computing sums of the gradient magnitude.

With respect to the overlapping rectangular windows, one embodiment includes eight concentrically arranged rectangles, the largest contains the entire frame and the smallest is centered in the image. Thus, at frame i, the sum of the frames is $s_j[i]$ for $j \in [1,2, \ldots 8]$. The sums in the strips of pixels lying between the rectangles is computed as the difference of these sums: $d_j[i]=s_j[i]-s_{j+1}[i]/h_j$, except for the special case $d_8[i]=s_8[i]/h_8$. The differences are normalized by the height of the strip $h_j$, which is approximately proportional to its area.

Figure 11:
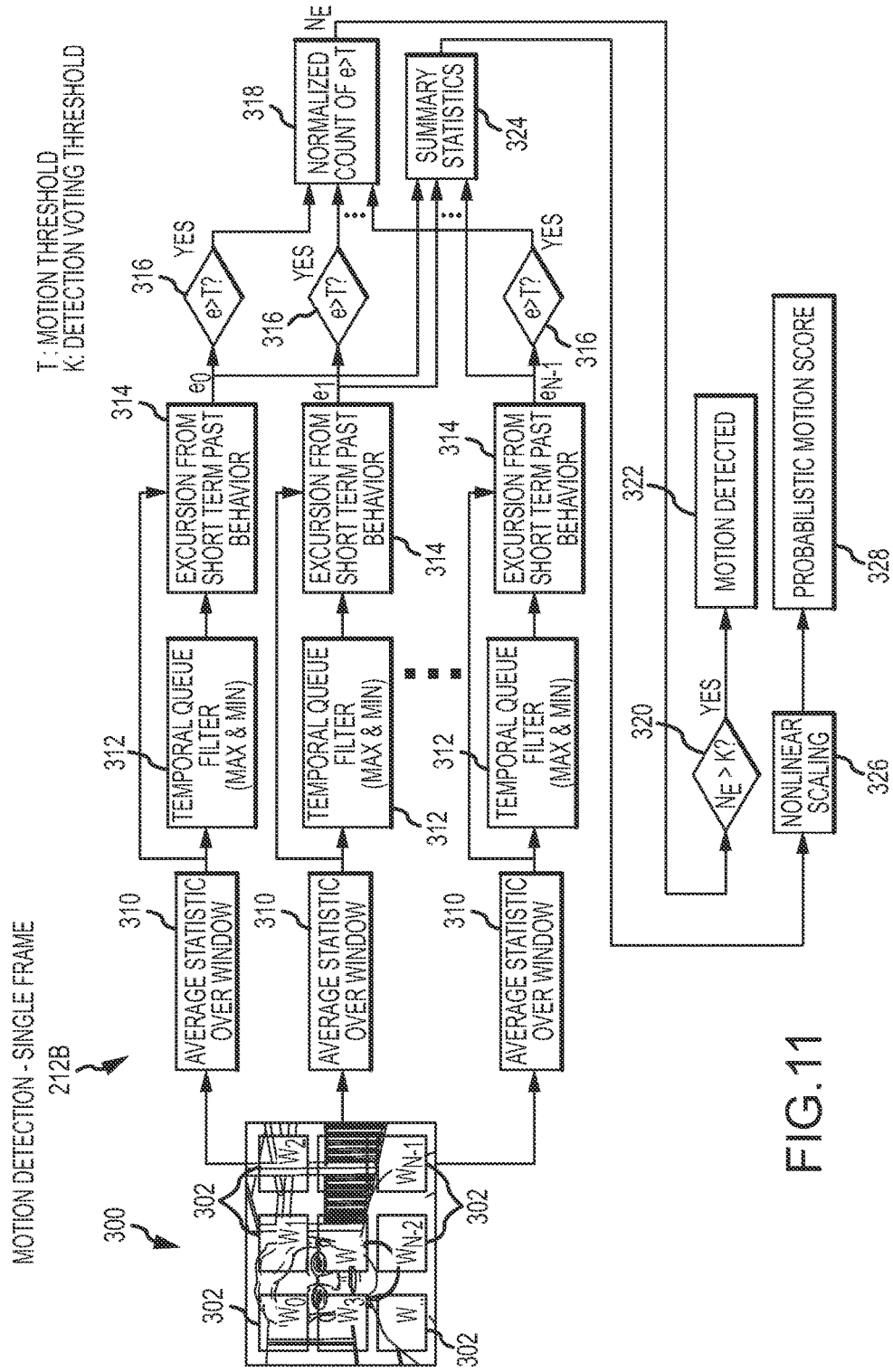
FIG. 11 is a flowchart illustrating an example method for single frame motion detection.

Next, the extrema u, v, (maximum and minimum) of the differences $d_j$ over the previous N frames is computed using queues, and the excursions $e_j=\max(d_j[i]-u, v-d_j[i])$. Comparing each excursion $e_j$ to a threshold gives an indicator of motion in region j of the frame. Subtle changes in lighting can produce false positive detections. True motion is usually associated with detection in two or three of the eight regions. Hence, in some embodiments, at least two regions detecting motion are required for a determination that motion has been detected in the frame. Additionally, large changes in lighting such as turning on or off the room lights, often results in many regions showing motion detection. Hence, detection may be suppressed if more than three regions have detected motion. These design parameters may be adjusted based on experience or to provide a desired level of sensitivity and robustness FIG. 11 is a flow chart illustrating the motion detection routine 212B using a single frame 300 with non-concentric windows 302. In some embodiments, each statistics window may be provided with a unique analysis pipe. That is, each window may be concurrently processed. In other embodiments, one or more windows may be processed sequentially in a common analysis pipe. As used herein, "analysis pipe" may refer to the processing steps associated with the statistical analysis of the windows and may include the temporal queue filter.

As discussed above, the image 300 may be divided into statistical windows 302 and an average statistic may be calculated for each window (Block 310). A temporal queue filter may be applied to the average statistic (Block 312) and an excursion value "e" from short term past behavior may be calculated (Block 314). The excursion value may be compared with a threshold to determine if it exceed the threshold (Block 316) A normalized count is kept for each excursion value that exceeds the threshold (Block 318) and if the normalized count exceed a voting threshold (Block 320), it is determined that motion has been detected (Block 322).

The excursion value may also be used to generate summary statistics (Block 324). The summary statistics may be nonlinearly scaled (Block 326) and a probabilistic motion score may be provided (Block 328). Generally, Block 322 will provide a binary one or a zero output indicating motion has been detected, whereas Block 328 will provide a value between zero and one indicating the likelihood that motion has been detected in the image 300.

As may be appreciated, a neural network, support vector machine (SVM) or other classification system may be utilized in each of the aforementioned routines to make a determination as to presence of a user. Additionally, a probability value of from each of the routines may be alone enough to make the determination that a user is present, for example, if a value is above a certain threshold. Moreover, in some embodiments a combination of the probabilities from each of the routines may be used in determining if a user is present. In some embodiments, the output of a routine may not be used as its validity may be questionable. For example, the skin tone detection routine may be unreliable due to the lighting. Moreover, the probabilities output from the routines may be combined in a weighted manner (e.g., one probability may be given more weight based on the likelihood of it being more accurate than the others).

Embodiments described herein may be implemented to reduce power consumption in computing devices, such as notebook computers, desktop computers, and so forth. In particular, the computing devices may provide presence sensing functionality even when the device is in a low power state, such as a hibernate or sleep state, so that the device may power up when a user is present and power down or enter a reduced power state when the user leaves. Further, the embodiments may be provided to improve a user experience with computing devices by providing intuitive powering up and powering down operation, as well as security features, among others.

A tiered system may be implemented that precludes the use of a main processor and RAM in low power operation. For example, in one embodiment, a lowest power state may implement only a camera, an image signal processing (ISP) device and an embedded processor that may calculate a presence value in real-time. In a next tier, a face detector chip and RAM may be turned on. In the subsequent tier, the system processor and other resources may be powered on.

In the examples described above for motion detection, therefore, memory of previous frames is limited to statistics computed by the ISP, and limited to the space available in the embedded processor registers and cache (e.g., 32 k), as RAM may not be available. Additionally, it should be appreciated, that the presence sensing information (e.g., statistics, images, and so forth) are not available outside of the presence sensing routines. That is, for example, an image captured for presence sensing may not be viewed by a user.

The foregoing describes some example embodiments for sensing the presence of user. Although the foregoing discussion has presented specific embodiments, persons skilled in the art will recognize that changes may be made in form and detail without departing from the spirit and scope of the embodiments. For example, modifications to one or more of the algorithms for presence sensing may be implemented. In one example, hardware limitations may drive the algorithm changes. Accordingly, the specific embodiments described herein should be understood as examples and not limiting the scope thereof.

The invention claimed is:

1. A method of operating a computing device to provide presence based functionality, comprising:
  receiving a current image at the computing device from an image capture device associated with the computing device;
  determining at least one light level of the received current image;
  identifying multiple windows within the received current image;
  computing statistics of each of the windows, wherein computing statistics for at least one of the windows uses the at least one determined light level;
  performing a motion detection routine that includes:
    comparing the statistics of the windows within the received current image to respective statistics of corresponding multiple windows within a previously received image;
    computing a respective excursion value for each window within the received current image based on the comparison;
    determining a first probability of user presence based on the excursion values;

making a binary determination of user presence; and
deciding if a user is present based on at least one of the first probability of user presence and the binary determination of user presence.

2. The method of claim 1, wherein the multiple windows within the received current image and the previously received image comprise multiple non-overlapping windows.

3. The method of claim 1, wherein at least one of the computed statistics is based on at least one of a luminance and an intensity gradient.

4. The method of claim 1, wherein the received current image and the previously received image are frames from a video sequence.

5. The method of claim 4, further comprising: comparing a first frame of the video sequence with a second frame that is delayed by an integer value and with a third frame that is delayed by twice the integer value.

6. The method of claim 1, further comprising determining a distance to the user in the case that it is decided that the user is present.

7. The method of claim 1, wherein making the binary determination of user presence comprises:
summing the number of excursion values that exceed a first threshold; and
comparing the sum to a second threshold.

8. A method of operating a computing device to provide presence based functionality, the method comprising:
receiving a current image at the computing device from an image capture device associated with the new computing device;
determining at least one light level of the received current image;
identifying multiple concentric overlapping windows within the received current image;
computing statistics of each of the windows;
performing a motion detection routine that includes:
comparing the statistics of the windows within the received current image to respective statistics of corresponding multiple concentric overlapping windows within a previously received image; and
determining a first probability of user presence using the comparison of the statistics; and
deciding if a user is present using the first probability of user presence;
wherein computing statistics of at least one of the windows within the received current image uses the at least one determined light level.

9. The method of claim 8, wherein the computed statistics include at least one of a luminance and an intensity gradient.

10. The method of claim 8, further comprising performing a face detection routine, wherein the face detection routine comprises:
applying a face detector to the received current image, the face detector providing a face presence score indicating a probability that a face is present; and
scaling and averaging the face presence score of the received current image and a face presence score of the previously received image to determine a second probability of user presence;
wherein deciding if the user is present uses a combination of the first probability of user presence and the second probability of user presence.

11. The method of claim of claim 10, further comprising:
comparing the first probability of user presence to a first threshold;
comparing the second probability of user presence to a second threshold;
deciding that the user is present when the first probability of user presence exceeds the first threshold and the second probability of user presence exceeds the second threshold.

12. An electronic device comprising:
a camera-based sensor;
a second sensor; and
at least one processor, wherein the processor is configured to apply a sequence of operations including:
receiving a current image from the camera-based sensor;
determining at least one light level of the received current image;
identifying multiple windows within the received current image;
computing statistics of each of the windows, wherein computing the statistics for at least one of the windows uses the at least one determined light level;
performing a motion detection routine that includes:
comparing the statistics of the windows within the received current image to respective statistics of corresponding multiple windows within a previously received image;
computing a respective excursion value for each window within the received current image using the comparison;
determining a first probability of user presence based on the excursion values; and
making a binary determination of user presence; and
deciding if a user is present based on at least one of the first probability of user presence and the binary determination of user presence.

13. The electronic device of claim 12, wherein:
the camera-based sensor includes a main camera; and
the camera-based sensor is linked to an image processor that receives the current image and the previously received image from the camera-based sensor.

14. The electronic device of claim 12, wherein the second sensor is a proximity sensor.

15. The electronic device of claim 12, wherein the multiple windows within the received current image and the previously received image comprise multiple non-overlapping windows.

16. The electronic device of claim 12, wherein the multiple windows within the received current image and the previously received image comprise multiple concentric overlapping windows.

17. The electronic device claim 12, wherein the received current image and the previously received image are frames from a video sequence; and the sequence of operations includes
performing a face detection routine that includes:
applying a face detector to the frames of the video sequence, the face detector providing a face presence score for each frame; and
scaling and averaging the face presence score of the received current image and a face presence score of the previously received image to determine a second probability of user presence;
wherein deciding if a user is present uses a combination of the first probability of user presence and the second probability of user presence.

18. The electronic device claim 12, wherein the sequence of operations comprises:
putting the electronic device into a first operational state when it is decided that the user is present; and putting the electronic device into a second operational state when it is decided that the user is not present.

19. A method of operating an electronic device to determine if a user is present, the method comprising:

receiving in a processor of the electronic device a first image at the electronic device from a camera-based sensor associated with the electronic device;

receiving in the processor of the electronic device initial statistics calculated from multiple windows that are part of a second image received from the camera-based sensor prior to the reception of the first image;

calculating updated statistics from the multiple windows that are part of the first image;

comparing the initial statistics to the updated statistics;

determining respective excursion values for the multiple windows using on the comparison;

determining a probability of user presence using the excursion values;

making binary comparisons of the excursion values to a threshold; and deciding that the user is present based on at least one of the probability of user presence and a sum of the binary comparisons.

20. The method of claim 19, wherein the initial statistics and the updated statistics are based on at least one of luminance data and intensity gradient data.

* * * * *